Nov. 21, 1950 J. MORRISON 2,530,898
HAMMER TOY
Filed June 1, 1950 2 Sheets-Sheet 1
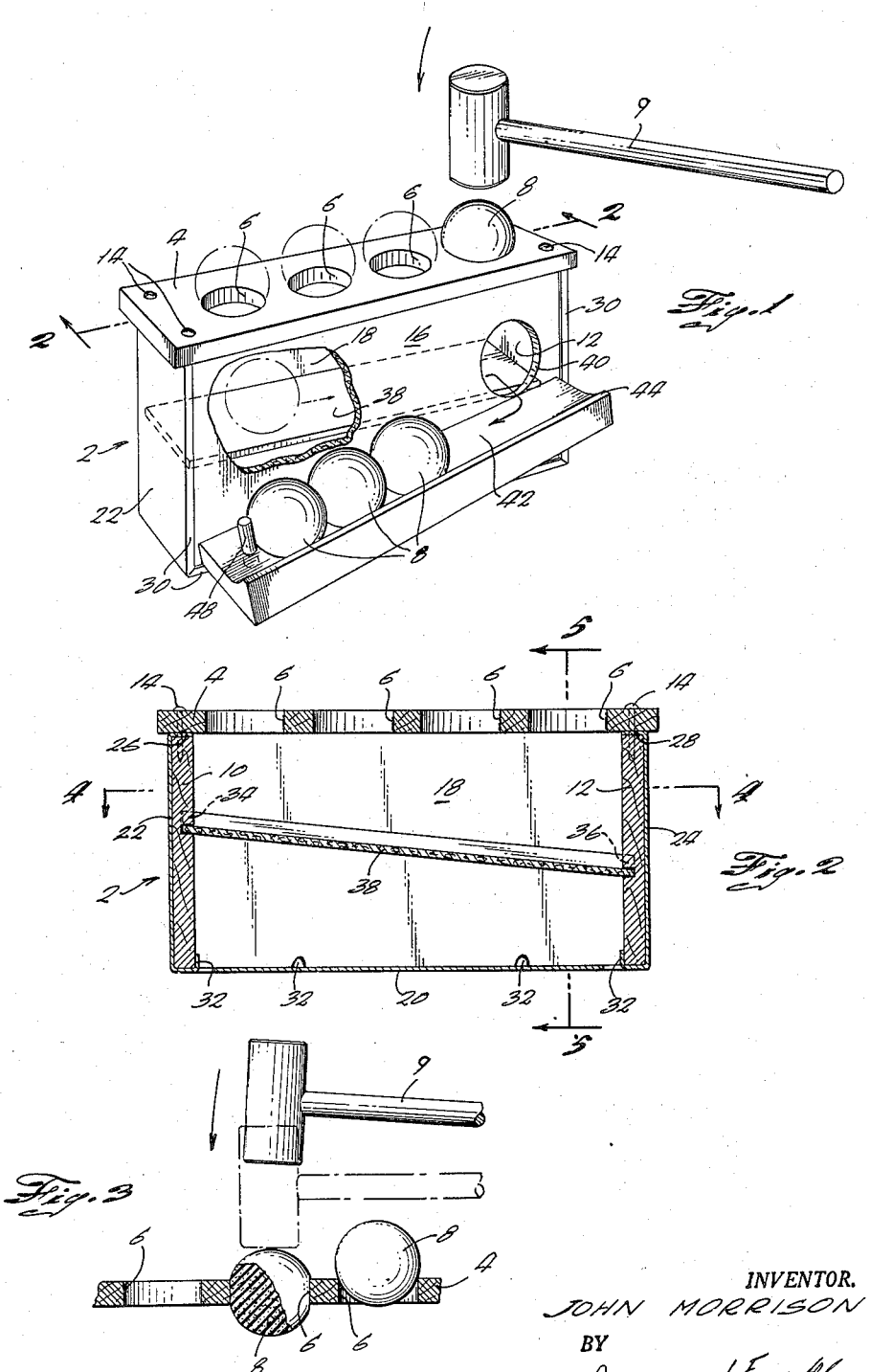
INVENTOR.
JOHN MORRISON
BY
James and Franklin
ATTORNEYS.

Nov. 21, 1950     J. MORRISON     2,530,898
HAMMER TOY

Filed June 1, 1950     2 Sheets-Sheet 2

INVENTOR.
JOHN MORRISON
BY James and Franklin
ATTORNEYS.

Patented Nov. 21, 1950

2,530,898

UNITED STATES PATENT OFFICE 2,530,898

HAMMER TOY

John Morrison, Franconia, N. H.

Application June 1, 1950, Serial No. 165,549

20 Claims. (Cl. 46—1)

The present invention relates to a hammer toy so constructed as to afford a high degree of entertainment, novelty and mystery to the youthful user thereof and at the same time to function as an educational toy teaching manual dexterity, coordination, and simple reasoning.

Hammer toys serve a very useful function in the training and amusement of young children. They not only provide a non-destructive outlet for their energies but they also teach manual dexterity and coordination. In their most common form a series of pegs or other members are adapted to be driven through apertures in a platform. In some embodiments once the pegs have been hammered through the apertures as far as they can go the apparatus is inverted so as to once again present the pegs for hammering. In other embodiments the pegs or other members are adapted to be driven completely through the apertures after which they are picked up and reinserted in the apertures. The latter type of toy has the advantage over the former that the youthful user acquires increased coordination and dexterity by picking up the peg and inserting it into the aperture prior to hammering it. However, these types of toys, despite their admitted educational value, are soon discarded by their user primarily because of the monotony of the operations involved. Their educational value is also limited by reason of the simplicity of their manner of use.

The toy of the present invention embodies all of the educational attributes of conventional hammer toys and in addition has elements of mystery and complexity which not only whet the interest of the users thereof, thus leading to greater use and hence greater acquisition of coordination and manual dexterity, but also teach a fundamental type of reasoning, the correlation of simple cause and effect, of which even very young children are capable.

In the toy of the present invention members are provided which are adapted to be hammered through apertures, thus training the child in coordination and manual dexterity in a manner similar to other hammer toys. This invention departs from previous similar constructions in that said members are rollable, and are preferably in the form of spherical balls, said members disappearing inside an enclosure after they have been hammered through an aperture and then, after an interval of time, reappearing from the enclosure at a different point from that through which they have been hammered. When they reappear they are caused to roll along a fixed inclined path and, in one specific embodiment of the invention, are adapted to be retained on that path so as to be accessible for reuse, the child picking up the ball, replacing it in one of the apertures, and again hammering. The period of time during which the ball is invisible and the fact that it becomes visible at a different point from that at which it became invisible is a source of constant fascination to young children, and hence they will tend to play with this toy for longer periods of time than with other toys of the same general type.

The ball or other rollable member, after it has been driven through the aperture, rolls down a series of inclined planes and its passage therealong in response to the force of gravity is educational in and of itself. Consequently, the toy is of utility even if the ball or other rollable member does not become invisible after it is hammered through the aperture.

In a more specific form of the present invention, a plurality of apertures are provided through which the ball or other rollable member may be hammered, those apertures being differently spaced from the point at which the ball again becomes visible. As a result, the interval of time between the instant when the ball is hammered through the aperture to become invisible and the instant when it reappears will vary depending upon the particular aperture through which it has been hammered. The interest of the child is piqued by this, and hence he not only plays with the toy more than he otherwise would, but he also eventually will come to correlate a particular time duration of invisibility with the particular aperture employed, thus giving him training in an elementary form of reasoning.

In accordance with a specific aspect of the present invention, the rollable members employed are in the form of rubber balls which are soft and resilient. The results of using such rollable members are manifold. The balls themselves are harmless and even if thrown wildly by the child (a not uncommon occurence) they will cause no harm or damage. The resilience of the balls permits them to be driven through the apertures relatively easily, thus calling for a minimum of effort on the part of the child and permitting the use of a very light hammer. Hence the toy can be used by very young children. Moreover, but a minimum of noise accompanies use of the toy, thus saving the nerves of parents and nurses. Providing a light hammer has the additional advantage that a child armed with it cannot do any appreciable damage to his surroundings.

The above objects are accomplished by providing an enclosure at the top of which is positioned the apertures through which the rollable members are to be hammered. Below these apertures and inside the enclosure is an inclined support onto which the rollable members are adapted to drop and along which they are adapted to roll. This support communicates with a relatively large aperture in one of the walls of the enclosure, the rollable member being freely passable through that aperture and rolling therethrough in response to the inclination of the partition. In the specific form here disclosed a ramp is provided on the outside of the enclosure with which the relatively large aperture communicates, the rollable member emerging from the enclosure via the large aperture and then rolling down the ramp.

To the accomplishment of the above objects, and such other objects as may hereinafter appear, the present invention relates to the construction of a hammer toy as defined in the appended claims and as described in this specification taken together with the accompanying drawings in which:

Fig. 1 is a three quarter perspective view of one embodiment of the present invention with a part of the side wall thereof broken away;

Fig. 2 is a cross-sectional view thereof taken along the line 2—2 of Fig. 1;

Fig. 3 is a detailed cross-sectional view of the top wall of the toy showing the manner in which a rubber ball is adapted to be driven therethrough;

Figure 4:
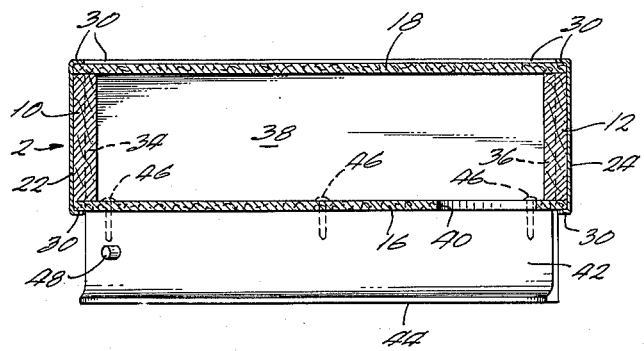
Fig. 4 is a cross-sectional view of the toy taken along the line 4—4 of Fig. 2.

The toy comprises an enclosure generally designated 2 having a top wall 4 with a row of apertures 6 of limited size therethrough. Rollable members, here shown in the form of rubber balls 8, are adapted to pass through those apertures 6, the balls 8 having a normal size somewhat larger than the size of the apertures 6 so that they can pass through those apertures 6 only upon the application of force thereto, preferably through repeated blows by the hammer 9.

The enclosure 2 is provided with a pair of end walls 10 and 12 to which the top wall 4 is secured by means of nails 14 or other similar securing devices. Side walls 16 and 18 extend beneath the top wall 4 and alongside the side edges of the end walls 10 and 12. A metal frame defines a bottom wall 20 closing the bottom of the enclosure, its ends being bent upwardly to form panels 22 and 24 covering the outside of the end wall 10 and 12 respectively and the end edges of the side walls 16 and 18, the panels 22 and 24 terminating in inbent lips 26 and 28 interposed between the tops of the end walls 10 and 12 and the lower surface of the top wall 4. The side edges of the metal frame, as generally designated by the reference numeral 30, are bent around the outside of the walls of the enclosure, and the bottom wall 20 is provided with a plurality of upstruck lips 32 (see Fig. 2) for engaging the inner surfaces of the walls, thus defining a self-sustaining and rigid structure. For purposes of strength the top wall 4 and end walls 10 and 12 may be of wood, while the side walls 16 and 18 may, if desired, be of fiberboard or other composition material.

Two opposite walls, here shown as the end walls 10 and 12, are provided with inclined grooves 34 and 36 respectively (see Figs. 2 and 4), both said grooves being inclined downwardly in the same direction, the groove 34 being higher than the groove 36. A partition 38 of wood, fiberboard, or other structural material is mounted within the grooves 34 and 36 and as a result said partition 38 will be inclined downwardly toward the end wall 12, that wall having the lower slot 36, and will also be inclined downwardly toward the side wall 16, since both slots 34 and 36 are downwardly inclined toward that wall.

The side wall 16 is provided with a relatively large aperture 40 of a size such that the ball or other rollable element 8 can freely pass therethrough. This aperture is positioned adjacent the lowest point of the partition 38 and hence close to the end wall 12.

Figure 5:
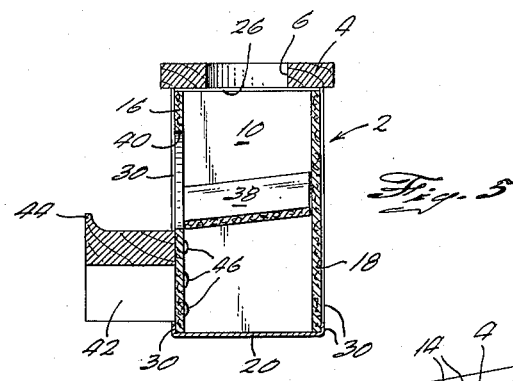
Fig. 5 is a cross-sectional view thereof taken along the line 5—5 of Fig. 2.

In the form here specifically disclosed a ramp 42 having an outer upstanding rim 44 is secured on the outer surface of the side wall 16 by means of nails or other securing devices 46 (see Figs. 4 and 5), said ramp 42 being downwardly inclined with its upper end alongside the large aperture 40 and, as here specifically disclosed, with its lower end adjacent the end wall 10 and substantially at the bottom level of the enclosure 2. A stop in the form of a peg 48 extends upwardly from the ramp 42 near its bottom end so as to prevent the balls 8, as they roll down the ramp 42, from rolling off therefrom.

Figure 6:
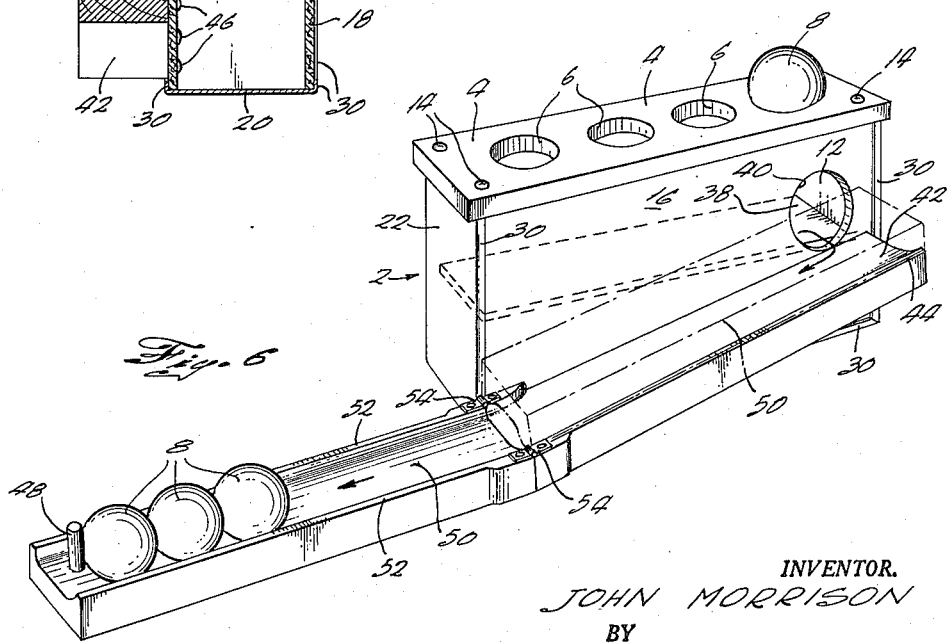
Fig. 6 is a three quarter perspective view similar to Fig. 1 but showing a modified embodiment.

In the embodiment illustrated in Fig. 6 the ramp 42 is provided with an extension 50, that extension having raised edges 52 on either side thereof and being connected by means of hinges 54 to the lower end of the ramp 42. In this embodiment the peg 48 is positioned near the free end of the ramp extension 50. When in use the extension 50 will assume a substantially horizontal position as illustrated in straight lines in Fig. 6 and when not in use the extension 50 is pivotable to a housed position overlying the ramp 42 and substantially coincident therewith, as illustrated by the broken lines in Fig. 6.

The manner of operation of the device will, to a trained mechanic, be fully apparent from the above description but it must be borne in mind that simple though the operation is, it presents a real challenge to youthful minds. Indeed, the presentation to such minds of any more complex operability would defeat its own purpose, since the child would be so baffled as to be frustrated, and hence he would not play with the toy. Experience has demonstrated that the particular arrangement above described has sufficient simplicity to interest a child even as young as one year of age yet has sufficient complexity to interest and educate children even of more advanced years.

Because of the spherical nature of the balls 8 and because they are somewhat larger in size than the apertures 6, those balls 8 can very readily be placed in the apertures 6 even by very young infants, the balls assuming the position illustrated by the right hand ball in Fig. 3, it being understood that because of its shape the ball 8 will center itself in the aperture 6 even if the child does not properly initially position it. Thereafter, when the ball 8 is forced through the aperture 6, as by use of the hammer 9, its own resiliency will permit it to be compressed, as illustrated by the left hand ball in Fig. 3, and as a result it may be readily forced through the aperture 6 without having to use a heavy hammer 9 and without engendering such friction between its outer surfaces and the inner surface of the aperture 6 as to cause either the ball 8 or the aperture 6 to become worn and hence unusable.

After the ball 8 has been completely hammered through the aperture 6 it will drop from the top wall 4 and, when the walls of the enclosure 2 are of opaque material, will become invisible. The ball will fall onto the inclined partition 38 and will roll therealong toward the end wall 12. When it comes opposite the large aperture 40 the inclination of the partition 38 downwardly toward the side wall 16 in which the aperture 40 is positioned will cause the ball 8 to roll out through aperture 40, the size of said aperture 40 permitting it to do so. It is not until the ball comes opposite the aperture 40 that it once again becomes visible, and it is only after it has rolled out through the aperture 40 onto the ramp 42 that it becomes fully visible. The length of time during which the ball 8 is invisible will depend upon the spacing from the aperture 40 laterally along the enclosure 2 of the aperture 6 through which the ball 8 has been forced. When the ball 8 is forced through the right hand aperture 6 it will become visible through the aperture 40 almost immediately, when it is forced through the left hand aperture 6 it will not become visible for some time, and when it is forced through any of the intermediate apertures 6 the duration of invisibility will be correspondingly varied.

The use of rubber balls has a very important additional advantage when taken in conjunction with the interest and mystery imparted by the invisibility feature. In the first place, the fall of a soft rubber ball onto the partition 38 will not be accompanied by an appreciable noise, and hence the mystery of the inner workings of the apparatus will be heightened. Moreover, the unpredictable manner of bouncing of rubber balls will vary the duration of invisibility from time to time even when the same aperture 6 is employed.

When the balls 8 roll onto the ramp 42 they will roll down that ramp, thus lending to the toy an element of visible motion which is most appealing to the children of the age group which will use the toy. The use of the peg 48 prevents the balls 8 from rolling away from the apparatus and along the floor of the room, instead retaining the balls 8 in a position such that they can readily be picked up and replaced on the apertures 6. Indeed, the fact that when a number of balls are used they will line themselves up along the ramp 42, as illustrated in Fig. 1, provides an added feature of entertainment and enjoyment.

The various parts of the toy cooperate to define a device which provides amusement to entertain, mystery to pique the interest, manipulation to teach coordination and provide exercise, a moderate amount of unpredictability to fascinate, cause and effect relationships to instruct, and beauty to attract, all these being achieved through a simple and inexpensive structure. It will be apparent that details of the structure can be varied without departing from the spirit of the invention as defined in the appended claims.

I claim:

1. A hammer toy comprising an enclosure having top, side and end walls, said top wall having a restricted aperture therethrough, a rollable member adapted to pass through said top wall via said restricted aperture and of a size such as to have a frictional fit in said restricted aperture so that it must be forced therethrough as by hammering, a partition in said enclosure under said aperture and inclined downwardly toward a wall of said enclosure, said wall having a large aperture alongside said partition adjacent its lowest point and of a size such that said rollable member will pass freely therethrough, and a ramp on the outside of said wall alongside said large aperture and inclined downwardly therefrom, whereby said rollable member, when hammered through said top wall via said restricted aperture, will fall inside said enclosure, roll along said partition, pass through said large aperture and roll along said ramp.

2. In the hammer toy of claim 1, a stop on said ramp for preventing said rollable member from rolling off said ramp.

3. The hammer toy of claim 1 in which said ramp comprises a downwardly inclined portion secured to said wall and extending substantially to the bottom level of said enclosure, and an extension portion hinged thereto so as to be movable between a housed position alongside said wall and overlying said inclined ramp portion and an operative substantially horizontal position extending from and constituting an extension of said inclined ramp portion.

4. In the hammer toy of claim 3, a stop on said ramp extension portion for preventing said rollable member from rolling off said ramp extension portion.

5. The hammer toy of claim 1, in which said rollable member comprises a rubber sphere having a diameter somewhat greater than the diameter of said restricted aperture but somewhat less than the diameter of said large aperture, said sphere thereby being readily contractible as it is hammered through said restricted aperture so as to reduce the frictional forces incident upon its passage therethrough.

6. The hammer toy of claim 1, in which said restricted aperture is spaced laterally along said enclosure from said large aperture, so that a time interval will elapse between the time that the rollable member passes through said restricted aperture and the time that it rolls through said large aperture.

7. The hammer toy of claim 1 in which said top wall is provided with a plurality of restricted apertures spaced therealong, said partition extending under each of said apertures, said restricted apertures thus being differently spaced from said large aperture so that the time interval between passage of the rollable member into the enclosure through said restricted aperture and its rolling through said large aperture will vary depending upon the particular restricted aperture through which the rollable member is hammered.

8. A hammer toy comprising an enclosure having opaque top, side and end walls, said top wall having a restricted aperture therethrough, a rollable member adapted to pass through said top wall via said restricted aperture and of a size such as to have a frictional fit in said restricted aperture so that it must be forced therethrough as by hammering, a partition in said enclosure under said aperture inclined downwardly toward a side wall and an end wall thereof, said side wall having a large aperture therein adjacent said end wall and alongside said partition adjacent its lowest point, said aperture being of a size such that said rollable member will pass freely therethrough, and a ramp on the outside of said side wall alongside said large aperture and inclined downwardly therefrom, whereby said rollable member, when hammered through said top wall via said restricted aperture, will disappear inside said enclosure, roll along said partition, pass through said large aperture and reappear, and roll along said ramp.

9. In the hammer toy of claim 8, a stop on said ramp for preventing said rollable members from rolling off said ramp.

10. The hammer toy of claim 8 in which said ramp comprises a downwardly inclined portion secured to said wall and extending substantially to the bottom level of said enclosure, and an extension portion hinged thereto so as to be movable between a housed position alongside said wall and overlying said inclined ramp portion and an operative substantially horizontal position extending from and constituting an extension of said inclined ramp portion.

11. In the hammer toy of claim 10, a stop on said ramp extension portion for preventing said rollable member from rolling off said ramp extension portion.

12. The hammer toy of claim 8, in which said rollable member comprises a rubber sphere having a diameter somewhat greater than the diameter of said restricted aperture but somewhat less than the diameter of said large aperture, said sphere thereby being readily contractable as it is hammered through said restricted aperture so as to reduce the frictional forces incident upon its passage therethrough.

13. The hammer toy of claim 8, in which said restricted aperture is spaced laterally along said enclosure from said large aperture, so that a time interval will elapse between the time that the rollable member disappears into said restricted aperture and the time that it reappears through said large aperture.

14. The hammer toy of claim 8 in which said top wall is provided with a plurality of restricted apertures spaced therealong, said partition extending under each of said apertures, said restricted apertures thus being differently spaced from said large aperture so that the time interval between disappearance of the rollable member into the enclosure through said restricted aperture and its reappearance through said large aperture will vary depending upon the particular restricted aperture through which the rollable member is hammered.

15. A hammer toy comprising an enclosure having opaque top, side and end walls, said top wall having a row of restricted apertures therethrough, a ball adapted to pass through said top wall via any one of said restricted apertures and of a size such as to have a frictional fit in said restricted apertures so that it must be forced therethrough as by hammering, a pair of opposite walls of said enclosure having grooves in the inner surfaces thereof inclined downwardly in the same direction, one groove being higher than the other, a partition supported in said grooves and thus being inclined downwardly toward one of said side walls and one of said end walls, said one of said side walls having a large aperture alongside said partition adjacent its lowest point and near said one of said end walls, said large aperture being of a size such that said rollable member will pass freely therethrough, a ramp on the outside of said one of said side walls alongside said aperture and inclined downwardly therefrom so as to extend substantially to the bottom level of said enclosure adjacent said other of said end walls, and a stop on said ramp adjacent its lower end for preventing said ball from rolling off said ramp.

16. The hammer toy of claim 15, in which said ball is made of rubber.

17. A hammer toy comprising an enclosure having opaque top, side and end walls, said top wall having a restricted aperture therethrough, a rollable member adapted to pass through said top wall via said restricted aperture and of a size as to have a frictional fit in said restricted aperture so that it must be forced therethrough as by hammering, a partition in said enclosure under said aperture inclined downwardly toward a side wall and an end wall thereof, said side wall having a large aperture therein adjacent said end wall and alongside said partition adjacent its lowest point, said aperture being of a size such that said rollable member will pass freely therethrough, a ramp on the outside of said side wall alongside said large aperture, and inclined downwardly therefrom, a ramp extension hinged to the lower end of said ramp so as to be movable between a housed position alongside said one of said side walls and overlying said ramp and an operative substantially horizontal position extending from and constituting an extension of said ramp, and a stop on said ramp extension adjacent the free end thereof, whereby said rollable member, when hammered through said top wall via said restricted aperture, will disappear inside said enclosure, roll along said partition, pass through said large aperture and reappear and roll along said ramp and said ramp extension up to said stop.

18. A hammer toy comprising an enclosure having top, side and end walls, said top wall having a plurality of restricted apertures spaced therealong, a rollable member adapted to pass through said top wall via one of said restricted apertures and of a size such as to have a frictional fit in a restricted aperture so that it must be forced therethrough as by hammering, a partition in said enclosure extending under each of said apertures and inclined downwardly toward a wall of said enclosure, said wall having a large aperture alongside said partition adjacent its lowest point and of a size such that said rollable member will pass freely therethrough, said restricted apertures being differently spaced from said large aperture, whereby said rollable member, when hammered through said top wall via a restricted aperture, will fall inside said enclosure, roll along said partition, and pass through said large aperture, the time interval between passage of the rollable member into the enclosure through a restricted aperture and its rolling through said large aperture varying depending upon the particular restricted aperture through which the rollable member is hammered.

19. A hammer toy comprising an enclosure having opaque top, side and end walls, said top wall having a restricted aperture therethrough, a rollable member adapted to pass through said top wall via said restricted aperture and of a size such as to have a frictional fit in said restricted aperture so that it must be forced therethrough as by hammering, and a partition in said enclosure under said aperture inclined downwardly toward a side wall and an end wall thereof, said side wall having a large aperture therein adjacent said end wall and alongside said partition adjacent its lowest point, said aperture being of a size such that said rollable member will pass freely therethrough, whereby said rollable member, when hammered through said top wall via said restricted aperture, will disappear inside said enclosure, roll along said partition, pass through said large aperture and reappear.

20. The hammer toy of claim 19 in which said top wall is provided with a plurality of restricted apertures spaced therealong, said partition extending under each of said apertures, said restricted apertures thus being differently spaced from said large aperture so that the time interval between disappearance of the rollable member into the enclosure through a restricted aperture and its reappearance through said large aperture will vary depending upon the particular restricted aperture through which the rollable member is hammered.

JOHN MORRISON.

REFERENCES CITED

The following references are of record in the file of this patent:

UNITED STATES PATENTS

| Number | Name | Date |
| --- | --- | --- |
| 408,635 | Sommer | Aug. 6, 1889 |
| 1,596,947 | Russel | Aug. 24, 1926 |
| 2,197,976 | Fletcher | Apr. 23, 1940 |
| 2,426,326 | Tooms | Aug. 26, 1947 |